United States Patent
Rossetti et al.

(10) Patent No.: US 6,202,521 B1
(45) Date of Patent: Mar. 20, 2001

(54) METHOD, APPARATUS AND CONTROLLER FOR MACHINING NON-CIRCULAR WORK PIECES

(75) Inventors: Dino J. Rossetti, Raleigh; William S. Jensen, Apex; John H. Highfill, III, Cary; Mark A. Norris, Apex, all of NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/210,971

(22) Filed: Dec. 14, 1998

(51) Int. Cl.$^7$ .................. B23B 1/00; B23B 21/00
(52) U.S. Cl. ............... 82/1.11; 82/1.3; 82/1.4; 82/158; 82/904
(58) Field of Search ............... 82/1.11, 12, 18, 82/19, 114, 158, 1.3, 1.4, 904

(56) References Cited

U.S. PATENT DOCUMENTS

| | | | |
|---|---|---|---|
| 3,174,404 | 3/1965 | Findley | 90/24 |
| 3,656,377 | * 4/1972 | Kosem | 82/29 A |
| 3,753,384 | 8/1973 | Anfindsen | 90/24 R |
| 4,203,062 | 5/1980 | Bathen | 318/571 |
| 4,250,779 | * 2/1981 | Feller et al. | 82/18 |
| 4,612,833 | * 9/1986 | Slee | 82/18 |
| 4,646,595 | 3/1987 | Slee | 82/2 B |
| 4,759,243 | * 7/1988 | Thompson | 82/1 C |
| 4,911,044 | * 3/1990 | Mishiro et al. | 82/158 |
| 4,986,150 | * 1/1991 | Okazaki | 82/137 |
| 5,022,294 | 6/1991 | Higuchi et al. | 82/18 |
| 5,054,340 | 10/1991 | Sugita et al. | 82/18 |
| 5,085,109 | 2/1992 | Hidehiko et al. | 82/18 |
| 5,170,103 | 12/1992 | Rouch et al. | 318/128 |
| 5,274,564 | * 12/1993 | Sugita et al. | 82/18 |
| 5,313,694 | 5/1994 | Yonemoto et al. | 29/27 R |
| 5,361,470 | * 11/1994 | Hamada et al. | 29/27 R |
| 5,735,028 | * 4/1998 | Furusawa et al. | 29/27 R |
| 5,802,937 | * 9/1998 | Day et al. | 82/1.11 |
| 5,816,122 | * 10/1998 | Benning et al. | 82/1.11 |
| 5,887,335 | * 3/1999 | Garshells | 29/602.1 |

FOREIGN PATENT DOCUMENTS

| | | | |
|---|---|---|---|
| 3516047 A1 | * 11/1986 | (DE) | 82/18 |
| 2612434 | * 9/1988 | (FR) | 82/18 |
| 0159101 | * 6/1989 | (JP) | 82/18 |

OTHER PUBLICATIONS

The Electrical Engineering Handbook, 2nd ed. Boca Raton, CRC Press LLC, 1997, p. 2285.*

EE Times, "Three–In–One Signal Generator Breaks $1,000 Price Barrier", internet address www.techweb.com, Apr. 1997.*

(List continued on next page.)

*Primary Examiner*—A. L. Wellington
*Assistant Examiner*—Erica Ergenbright
(74) *Attorney, Agent, or Firm*—Michael M. Gnbius; Randall S. Wayland (57) ABSTRACT

A method, apparatus and controller for machining non-circular work pieces. The apparatus, method and controller are preferably used in combination with rotating, equipment, such as a turning center having an x-y table capable of gross movements. The apparatus includes at least one position sensor for deriving an angular position signal of the work piece, a preferably longitudinally-disposed, flexible tool holder attached to a rigid tool block which holds the machine tool, a preferably solid state vibration actuator imparting active vibrational forces to the end of the tool holder, thus vibrating the machine tool at high frequency to impart the desired ovality to the work piece, and a control system for generating the output signal to the vibration actuator. Preferably, the control system includes manually adjusted magnitude and phase thereby providing a non-circular work piece profile with the desired ovality and positioning thereof. The controller includes a wave form generator which provides an input signal which is phase locked to the work piece rotation regardless of small cutting speed changes.

30 Claims, 7 Drawing Sheets

OTHER PUBLICATIONS

Michler, J.R., K.S. Moon, J.W. Sutherland, A.R. Kashani, 1993, "Development of a Magnetostriction Based Cutting Tool Micropositioner," Transactions of NAMRI/SME, vol. XXI, pp. 421–427.*

Telulex Inc. SG–100A Product Specification, internet address www.telulex.com.*

Sturos, Sutherland, Moon, Liu, Kashani; Application Of An Actively Controlled Magnetostrictive Actuator To Vibratio Abatement In The Turning Process, DSC–vol. 57–1, 1995 IMECE, ASME 1995, pp 539–544.

* cited by examiner

METHOD, APPARATUS AND CONTROLLER FOR MACHINING NON-CIRCULAR WORK PIECES

FIELD OF THE INVENTION

This invention relates to the areas of controllable machine tools, active machining methods and controllers therefor. More specifically, it relates to an apparatus, method and controller for machining non-circular work piece profiles, such as on pistons for internal combustion engines.

BACKGROUND OF THE INVENTION

For some types of machined work pieces, it is desirable to have a non-circular profile (example: oval) where the positions of the major and minor diameters are precisely located on the work piece. For example, on pistons for internal combustion engines, such as in automobiles, lawnmowers, weed trimmers, leaf blowers, chainsaws, etc., it may be desirable to have the minor dimension substantially aligned with the wrist pin (the wrist pin rotatably connects the piston to the connecting rod). During, use, the piston may nonuniformly expand to a greater extent across the wrist pin dimension. By proper alignment of the major and minor diameters on the piston, this non-uniform expansion can be accounted for and the piston will take on a substantially circular shape upon reaching its equilibrium operating temperature. This results in better performance and may reduce noxious emissions.

Various machines are known for providing actively controlled machining. For example, in a paper entitled "Application Of An Actively Conti-oiled Magnetostrictive Actuator To Vibration Abatement In The Turning Process", ASME 1995 DSC-Vol. 57-1 IMECE, by T. J. Sturos et al. it was suggested that a magnetostrictive actuator, such as made from a Terfenol-D material, may be used in a lathe to impart active control forces to a vertically disposed flexibly mounted tool holder. A position sensor was used to implement feedback control of the tool position. It was indicated by the authors that a 40% improvement in surface roughness was achieved during cutting via reducing tool chatter phenomena. U.S. Pat. No. 4,646,595 to Slee describes a machine tool which includes an actively driven machine tool (see FIG. 4) for machining piston profiles. A frequency generator produces a very high frequency ultrasonic signal which is modulated by a modulator 11 and fed to an ultrasonic transducer 13. An axial sensor on the tool head provides feedback control of the tool. U.S. Pat. No. 5,085,109 to Hidehiko et al. teaches a system for machining non-circular work pieces having a second axis slider (3) which is slideably moved by a second axis servomotor (5) at high speed. However, in the Hidehiko et al. system, the slider (3) may undesirably tend to wear over time.

Another problem with machining non-circular profiles occurs when the frequency of the lathe changes during machining due to temperature changes, etc. During such events, it is desired to have an accurate input signal which is phase locked to the part rotation frequency.

Accordingly, there exists a need for a simple and cost effective method, apparatus and controller for providing high speed machining of non-circular work pieces. Furthermore, a need exists for a system where the generated output signal is insensitive to frequency changes.

SUMMARY OF THE INVENTION

In view of the above discussion, the present invention is an apparatus, method and controller useful for machining a non-circular profile on a work piece. The apparatus, method and controller are adapted for use in combination with a turning, center (ex. Lathe or other rotating equipment) having a frame, an x-y table capable of gross horizontal movements relative to the frame, a spindle-driven rotating shaft and a work piece securing chuck.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

According to the invention, an apparatus is provided for machining of a non-circular profile on a work piece, the work piece having an axis of rotation, the apparatus comprising at least one position sensor for deriving at least one position signal correlated with a rotational position of the work piece, a vibrating tool assembly further comprising; a rigid tool block, a tool holder including first and second ends defining, a longitudinal axis, the tool holder mounted to the block at the first end and adapted to receive a machine tool at the second end, the tool holder including an integral spring member for providing relative ease of movement at the second end of the tool holder in a transverse direction, the longitudinal axis of the tool holder being disposed substantially parallel to the axis of rotation, and an actuator (such as a solid state actuator—piezoelectric or magnetostrictive) arranged to impart vibrational motions to the tool holder along the transverse direction, a control system for receiving the at least one position signal and generating an output signal to the actuator, the control system including; means for adjusting a magnitude and phase of the at least one position signal and producing a magnitude and phase adjusted output signal, and an amplifier for amplifying the magnitude and phase adjusted output signal whereby a non-circular profile is machined on the work piece with minimum and maximum dimensions precisely located in desired positions and where a desired amount of ovality (difference between major and minor diameters) is achieved.

The control system preferably includes a controller for generating a two per revolution square wave directly from the at least one position signal. Signal conditioning means may be provided in the controller for manipulating the square wave signal to produce a two per revolution sinusoidal signal. Means for adjusting a magnitude and phase of the sinusoidal signal are also included in the control system for providing an adjusted output signal. An amplifier amplifies or attenuates the adjusted output signal. Preferably, the means for adjusting the magnitude and phase are manually operated by a user. The apparatus enables a non-circular profile to be machined on the work piece whose minimum and maximum dimensions are precisely located in desired positions with the desired amount of ovality achieved.

According to the invention, the tool holder is preferably longitudinally disposed and may include a dog bone-shaped cutout portion which minimizes rotation of the machine tool upon application of the active forces. In a preferred embodiment, the at least one sional is provided by first and the second sensors located on an end of the shaft. In order to minimize vertical movement of the tool thereby minimizing chatter, a vertical stiffening spring element may be mounted between the end of the tool holder and the block.

Most preferably, the means for generating the phase locked sinusoidal input comprises a plurality of band pass filters, such as center adjustable switched capacitor filters.

Feedback means are preferably provided for adjusting the plurality of band pass filters. The feedback means may adjust a clock frequency provided to a plurality of switched capacitor filters.

Preferably, the vibrating tool assembly in accordance with the invention includes the tool block having an upright portion and a platform formed thereon, the tool holder being bolted to the platform at one end thereof, the actuator being mounted to a bracket assembly secured to a backside of the tool block on one end and threadedly connected to the tool holder on another, the actuator being received through a hole formed in the upright portion.

In accordance with the invention, a method for machining a non-circular profile on a work piece is provided which comprises the steps of positioning the work piece within a rotating chuck of a machine in a predetermined orientation, the work piece including an axis of rotation; providing at least one sensor for deriving, at least one input signal representative of a rotational position of the work piece, providing a tool block moveably mounted to the machine, mounting a tool holder to the tool block such that a longitudinal axis of the tool holder is substantially parallel with the axis of rotation, the tool holder including a spring member allowing ease of movement of an end portion of the tool holder in a transverse direction, connecting an actuator to the end portion of the tool holder, providing a control system, processing the at least one input signal within the control system to produce a magnitude and phase adjusted output signal, and providing the adjusted output signal to the actuator to machine a non-circular profile on the work piece in accordance with the output signal, the profile including minimum and maximum dimensions precisely located in desired positions on the work piece and where a desired amount of ovality of the work piece is achieved.

In accordance with the invention, an apparatus is provided comprising a sensor producing a signal correlated with a member's motion, a vibrating assembly including a base, a object mounted relative to the base, and an actuator interconnected between the base and the object, a control system including means for generating a square wave based upon the signal, a waveform generator for producing a sinusoidal input which is phase locked to the square wave, the generator further comprising a plurality of center adjustable band pass filters, and feedback means for adjusting a band of each the filter, means for adjusting a magnitude and phase of the sinusoidal input and producing a magnitude and phase adjusted output signal, and an amplifier for amplifying the adjusted output signal and producing an amplified output signal whereby the amplified output signal is provided to the actuator to vibrate the object.

It is another advantage of the apparatus that it provides a simple and cost effective system which adds functionality to standard lathes by adding the capability of precisely machining non-circular profiles.

It is an advantage of the controller that it includes a frequency tracking loop that provides for a sinusoidal input signal whose phase is locked to a square wave input signal and which is generally phase insensitive to small frequency changes.

The above-mentioned and further aspects, advantages, and characteristics of the present invention will become apparent from the accompanying description of the preferred embodiment and attached drawings.

BRIEF DESCRIPTION OF THE DRAWINGS

The accompanying drawings which form a part of the specification, illustrate a key embodiment of the present invention. The drawings and description together, serve to fully explain the invention. In the drawings.

FIG. 1b illustrates an end view of the shaft of the apparatus of FIG. 1a;

FIG. 2 illustrates a first input wave form generated by a first hall effect input sensor;

DETAILED DESCRIPTION OF THE PREFERRED EMBODIMENT

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
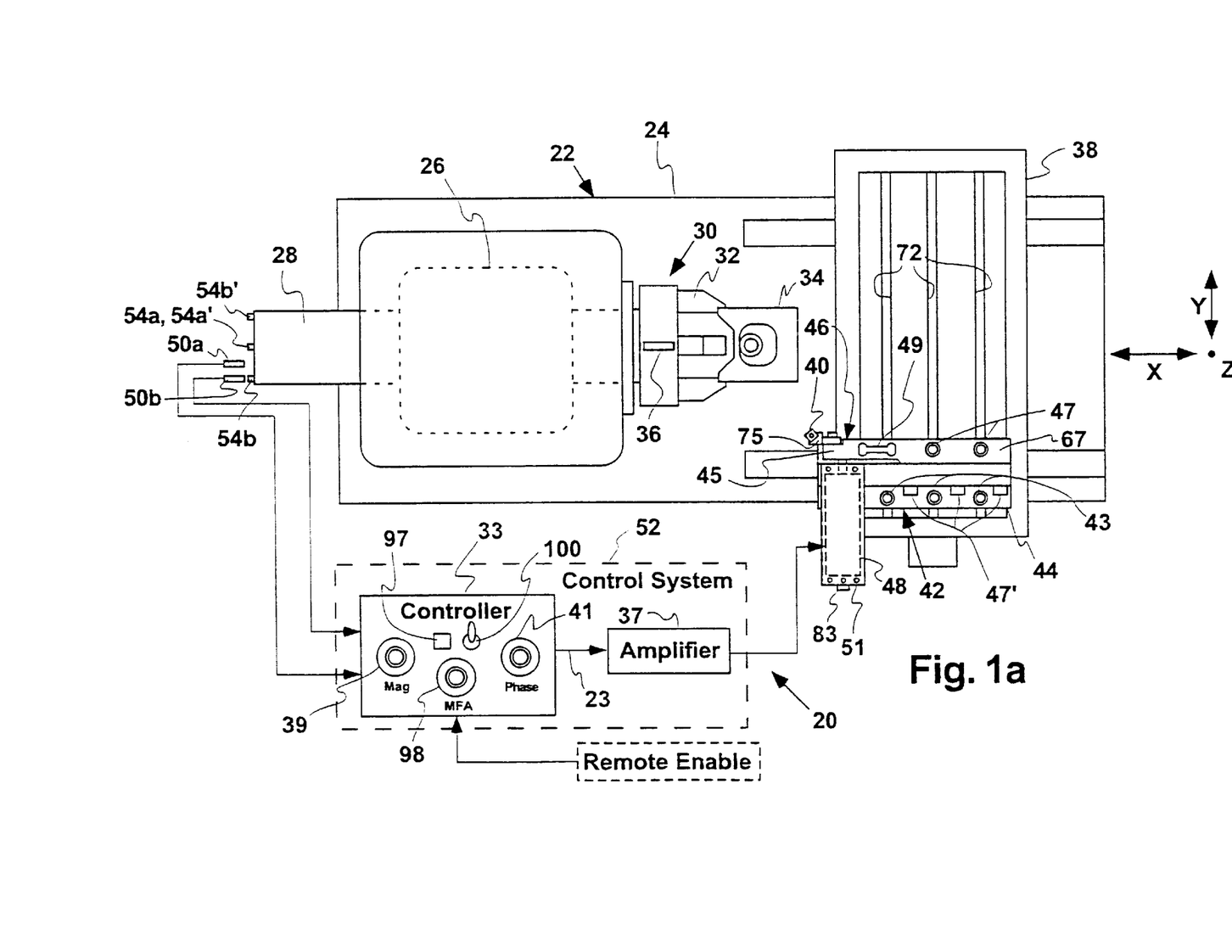
FIG. 1a illustrates a top view of the apparatus in accordance with the present invention mounted to a piece of equipment (turning, center)

In FIG. 1a, shown generally at 20 is a first embodiment of the present invention apparatus for machining non-circular work pieces. This apparatus 20 is preferably utilized in combination with a turning center, lathe or other metal machining equipment 22 for precisely machining non-circular profiles on a rotating work piece 34. The equipment 22 preferably comprises a frame 24 onto which a spindle 26 and shaft 28 are rotatably mounted; the spindle 26 and shaft 28 being fixedly secured to each other. A chuck 30 mounted to shaft 28 includes a plurality of moveable jaws 32 which securely clamp the work piece 34 in place for rotation with the shaft 28. By way of example, the work piece 34 may be a piston forging, piston casting, bar stock, etc. Work piece 34 is clamped in a defined positional relationship with respect to the shaft 28, for example, by aligning a certain defined geometrical parameter (example, the wrist pin axis location) with a mark 36 placed on the chuck 30.

More preferably, the alignment is provided because the equipment 22 includes a stopping, feature that precisely stops the chuck 30 at a predetermined rotational position for robotic loading of the work piece 34. The robot automatically loads the work piece 34, such that a predetermined orientation of the work piece 34 is provided in the chuck 30. The work piece 34 is then clamped in this predetermined orientation, such that the minimum and maximum dimensions of the non-circular profile can be machined at the desired locations. For example, in the case of a piston casting, the low dimension will preferably be aligned with the wrist pin bore axis.

The equipment 22 further includes a moveable X-Y table 38 mounted on the lathe frame 24 which is capable of gross longitudinal and transverse movements along the X and Y axes, respectively. These motions may be accomplished by various mechanisms such as, for example, ball screw mechanisms as are known to persons of ordinary skill in the art. The table 38 may be manually moveable or CNC controlled. In operation, the turning center traverses the tool 40 along the longitudinal X axis to machine along the length of the work piece 34 as well along, the transverse Y direction for machining the appropriate diameter dimensions.

In accordance with the present invention, the non-circular work piece machining apparatus 20 provides a separate add-on system which is useable in combination with the equipment 22 (such as a turning, center) to enhance the capabilities thereof. As best seen in FIG. 1a, the present invention enables the user to machine non-circular profiles on the work piece 34, a feat which the turning center by itself is incapable of. The apparatus 20 is comprised of a vibrating tool assembly 42, at least one or, more preferably, two input sensors 50a, 50b and a control system 52 which is preferably manually adjustable by a machine operator (the user). Optionally, the control, system may include digital controls.

Figure 6:
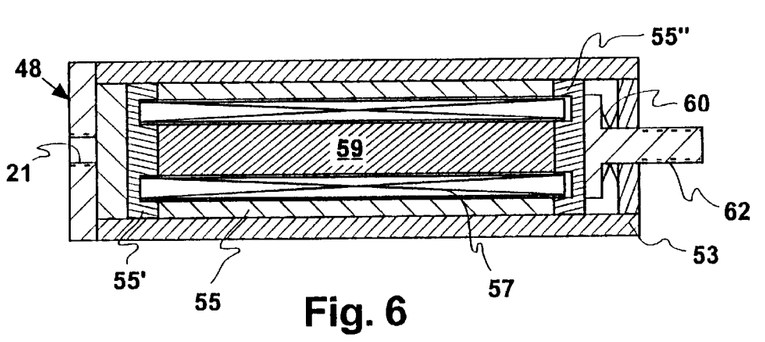
FIG. 6 illustrates a cross-sectioned side view of an actuator.

Again referring to FIG. 1a, the vibrating tool assembly 42 is shown which includes a rigid tool block 44, a flexible tool holder 46 and an actuator 48. The tool block 44 is adapted to be rigidly secured to the X-Y table 38 by plurality of bolts 43 and T-nuts (not shown) which are received in table T-slots 72. The flexible tool holder 46 is longitudinally mounted by bolts 47 onto the tool block 44 at one end and is free to move in the transverse direction at the other. Actuator 48 is interconnected between the tool block 44 and the tool holder 46 by a bracket assembly 51. The actuator 48, as shown in FIG. 6, is preferably a solid state actuator, such as a magnetostrictive or piezoelectric actuator. The preferred actuator 48 is a model AA-140J013-ESL Modified which is available from Etrema Products, Inc. of Ames, Iowa and includes a Terfenol rod element. Other suitable actuators, such as piezoelectric actuators, which can produce motion forces of about +/−200 lbf. at up to about 12,000 rpm may be used.

The tool holder 46 is mounted on, and secured to, the tool block 44 at the first end 67 by vertical bolts 47 and horizontal bolts 47'. The second end 45 of tool holder 46 being, free to flex and move in the Y (transverse) direction yet is substantially stiffer in the vertical Z and axial X directions. Preferably, the tool holder 46 includes a dog bone-shaped cutout 49 which provides appropriate flexing, stiffness in the transverse Y direction in the range of between about 3,000 lbf./in. and 30,000 lbf./in., and more preferably about 5,000–9,000 lb./in. The dog-bone cutout 49 or other spring member reduces the rotation of the tool mounted to the end 45 of tool holder. A machined relief formed on the actuator side of the tool holder 46 ensures that it may be freely vibrated without interference with the tool block 44. A standard machine cutting tool 40 is secured to the second end 45 of the holder 46 via a standard tool cartridge 75 as is well know to those of ordinary skill in the art. The tool holder 46 provides a flex beam onto which the tool 40 is mounted thereby providing means allowing it to flexed transversely relatively easily along the transverse Y axis, whilst retaining high stiffness in the vertical Z (into and out of the paper) and longitudinal X directions.

In operation, the actuator 48 is actively oscillated at twice the frequency of rotation (2 per rev) of the work piece 34. Because of this oscillation, the end 45 of the tool holder 46 is flexed and the tip of the tool 40 is resultantly traversed in a dynamic fashion along the Y axis. This flex beam arrangement provides a system that can be actuated at up to at least 6000 rpm, or even higher depending on the responsiveness of the actuator being used. This enables machining of non-circular profiles at high rotational speeds. The control system 52 is preferably manually adjusted by the user to set the appropriate phase and magnitude to achieve the desired amount of ovality as well as to set the positions of the major and minor diameters on the work piece 34. Simply, this is accomplished by manually adjusting the magnitude and phase dials 39 and 41 of controller 33. Similarly, in a digitally controlled system, the magnitude and phase would be set by the machine operator as an input.

Figures 1B, 2:
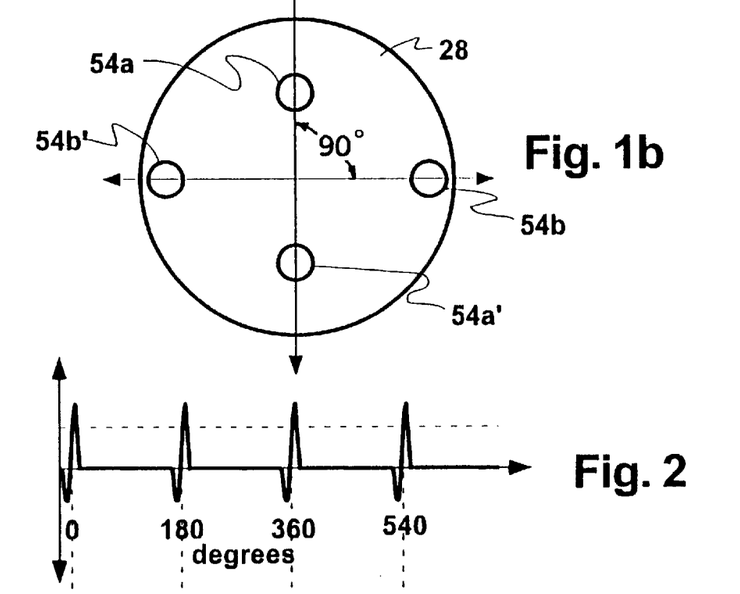
Figure 3:
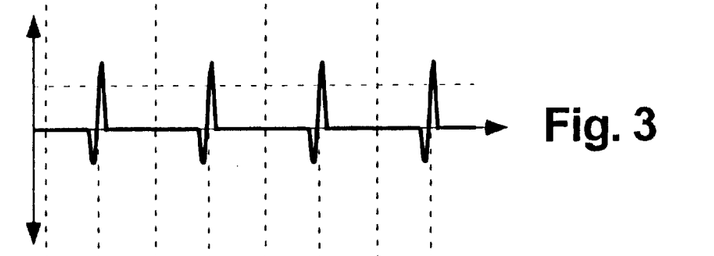
FIG. 3 illustrates a second input wave form generated by a second hall effect input sensor.

The input sensors 50a, 50b are used to provide a 2 per rev signal from senders 54a, 54a', 54b, 54b' located on the end of shaft 28 as best seen in FIG. 1b. The sensors 50a, 50b are preferably hall effect sensors, but optionally may be optical sensors. In the case of the hall effect sensor, the senders 54a, 54a', 54b, 54b' are bolt heads or other ferromagnetic material. If an optical sensor is used, the senders 54a, 54a', 54b, 54b' are reflective strips. In each case, the senders 54a, 54a' and 54b, 54b' are positioned 180 degrees apart on the shaft 28 and one of the senders, ex. sender 54a, is preferably aligned with the mark 36 on spindle 26 or the stopping, position of the chuck 30. When the shaft 28 rotates, input signals such as shown in FIGS. 2 and 3 are generated. FIG. 2 represents a signal generated by output from the first sensors 54a, 54a'. FIG. 3 illustrates a signal generated from output from the second sensors 54b, 54b' which are positioned 90 degrees from the first sensors 54a, 54a' and, therefore, produce a signal which is 90 degrees out of phase with the first signal.

Figure 4:
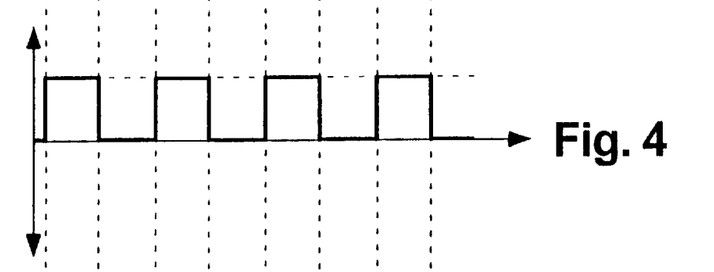
FIG. 4 illustrates a square wave form derived from the first and second input wave forms.
Figure 5:
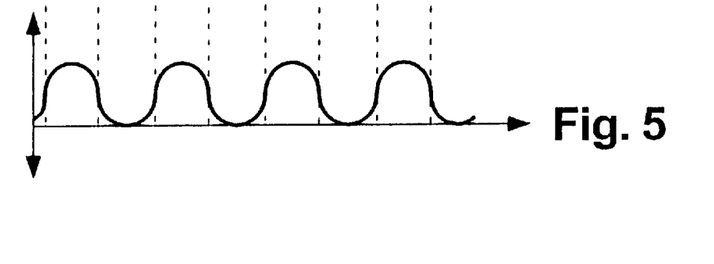
FIG. 5 illustrates a sinusoidal input signal synchronized with the square wave form.
Figure 7A:
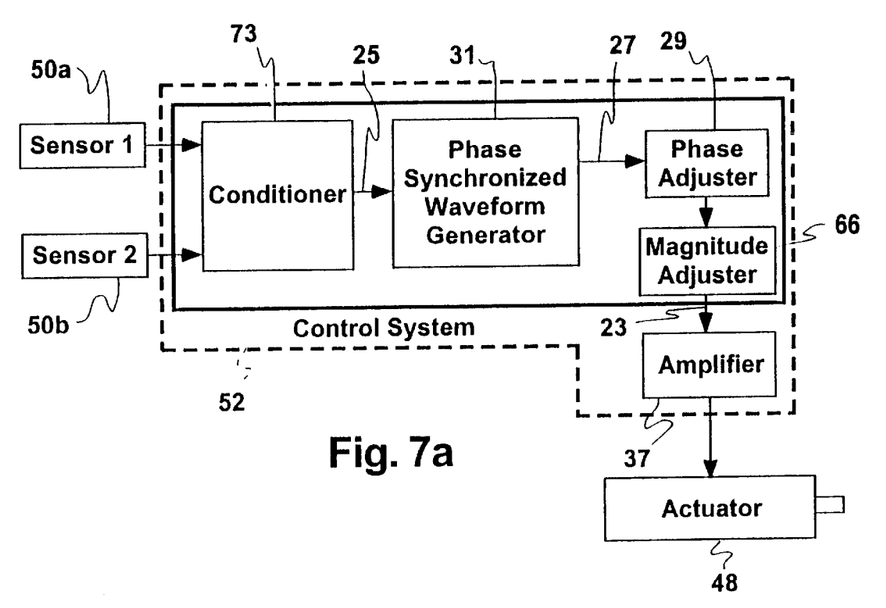
FIG. 7a illustrates a simplified block diagram outlining the components of the apparatus in accordance with the present invention.

The control system 52 includes a signal conditioner 73 (FIG. 7a) which conditions the raw signals from sensors 54a, 54a' and 54b, 54b' to produce the square wave form shown in FIG. 4. This square wave signal (FIG. 4) is then filtered through a novel phase synchronized wave form generator 31 which includes center frequency adjustable band pass switched capacitor filters 77, 79 (FIG. 7b) to produce a phase synchronized input signal 27. The phase synchronized 2 per rev sinusoidal input signal in line 27 has the sine wave form shown in FIG. 5. The input signal 27 is phase locked to the input square wave form of FIG. 4 in line 25 (FIG. 7a). The input signal in line 27 is then phase adjusted in phase adjustment section 29 and amplitude adjusted in gain adjustment section 66 to produce a phase and magnitude adjusted output signal 23. This signal 23 is then passed to amplifier 37 to provide a magnitude and phase adjusted two per revolution output signal which is appropriately amplified to drive the actuator 48. As shown in FIG. 5, the input signal includes zero phase adjustment, i.e., it is locked to the input. However, it should be noted that the phase may be adjusted by as much as 360 degrees by the control system 52 and the magnitude adjusted from zero to a maximum allowable by the actuator 48.

Figure 9:
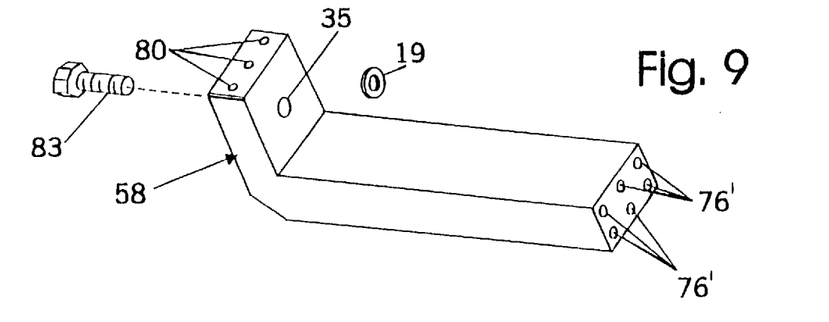
FIG. 9 illustrates a perspective view of an L-bracket portion of the bracket assembly.
Figure 10:
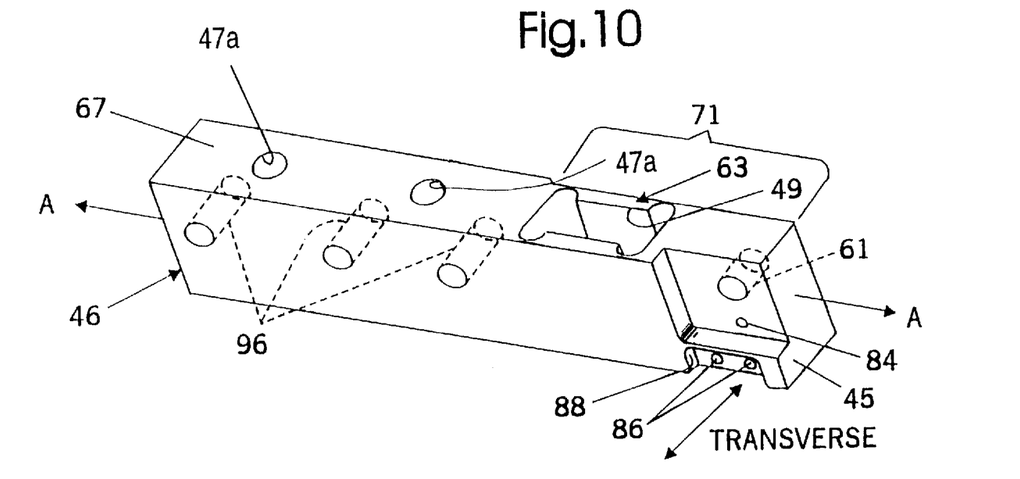
FIG. 10 illustrates a perspective view of the flexible tool holder.
Figure 13:
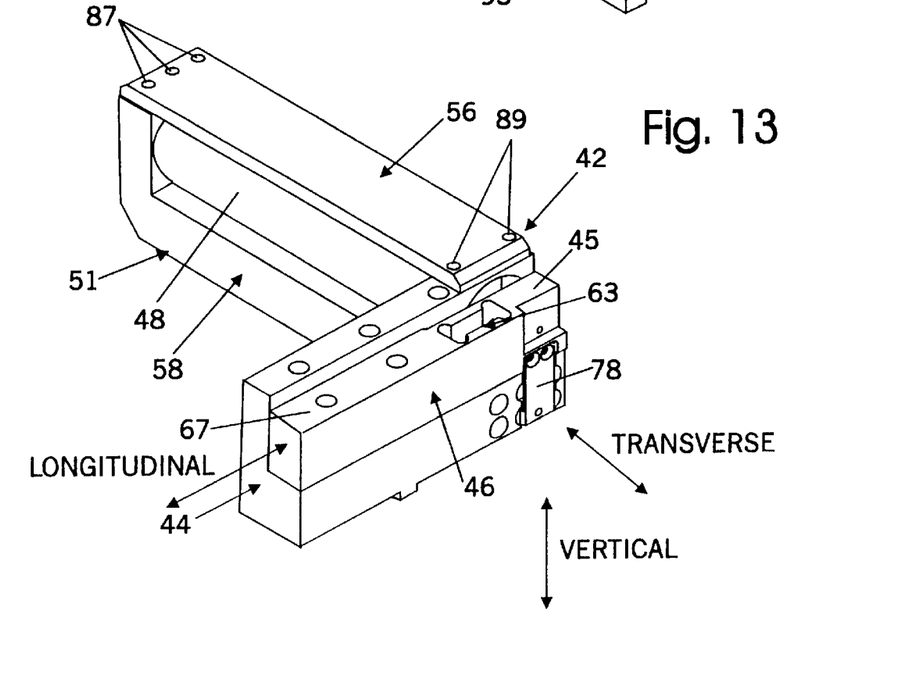
FIG. 13 illustrates the vibrating tool block assembly in accordance with the present invention.

FIG. 6 illustrates a cross-sectioned view of the preferred actuator 48 in accordance with the present invention. The actuator 48 preferably includes a solid state macynetostrictive element 59 (including a terfenol rod), a cylindrical housing 53, magnetically permeable soft magnetic flux path members 55, 55', 55" which carry the magnetic field developed by energizing circumferentially wound coil 57 and preloading spring 60 which preloads the macynetostrictive element 59. The actuator 48 is installed between the second end 45 of tool holder 46 and the lower L-bracket 58 (FIG. 13). The threaded rod 62 is threaded into a threaded hole 61 in the tool holder 46 (FIG. 10). A bolt (not shown) passes through hole 35 in L-bracket 58 (FIG. 9) and threads into the threaded hole 21 formed in actuator 48. One or more shims 19 (FIG. 9) are used to properly space the actuator 48 relative to the L-bracket 58 such that minimal stressing of the tool holder 46 occurs due to installation. By way of example and not to be considered limiting, the ovality (difference between the major and minor diameters) which can readily be produced on the work piece 34 is up to about 0.004 inch (0.102 mm) at about 1,000–6,000 rpm. It should be recognized that any suitable actuator that can generate additional stoke at the same frequencies would expand the useable range of the apparatus. To avoid tool chatter, the inventors herein determined that the actuator should include a transverse stiffness of at least about 100,000 lb./in. (17.5 Million N/m).

FIG. 7a illustrates a simplistic block diagram of the elements included within the apparatus 20. First and second sensors 50a and 50b provide 2 per rev input signals which are 90 degrees phase shifted from each other. These signals are provided to signal conditioner 73 which functions to produce a square wave of a constant duty cycle in line 25 and which is of a frequency equal to twice the rotational frequency of the work piece 34 (FIG. 1). This square wave signal 25 is provided to the phase synchronized wave form generator 31 which includes center adjustable band pass filters 77, 79 (FIG. 7b) and produces at its output in line 27 a sinusoidal wave form which is phase locked to the input square wave in line 25 regardless of whether the frequency of rotation of the work piece changes slightly. This output sinusoidal signal in line 27 is then passed through a phase adjusting section 29 and a magnitude adjusting section 38 where the phase and magnitude are adjusted, preferably manually by the user.

Figure 7B:
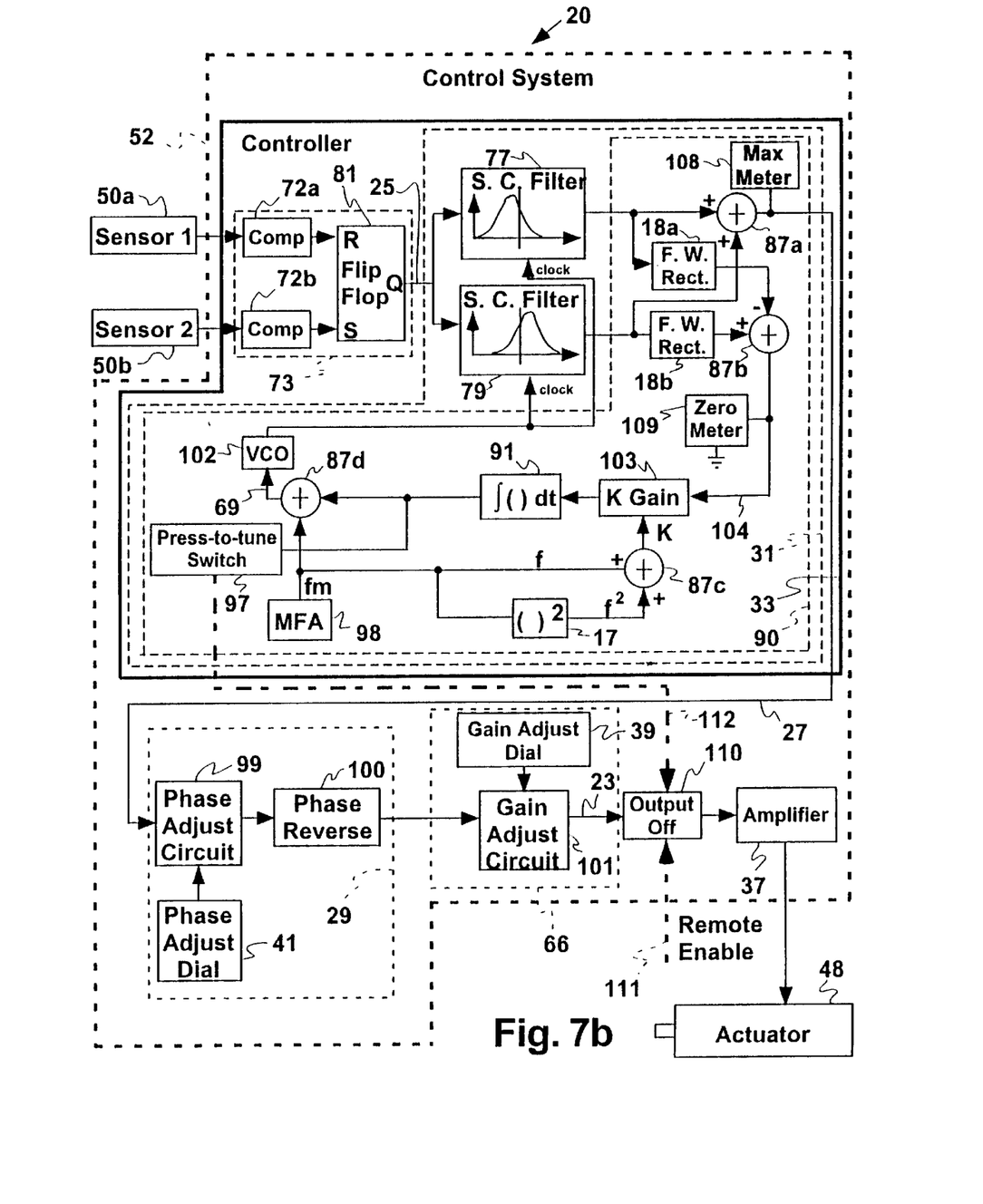
FIG. 7b illustrates a detailed block diagram outlining the components of the apparatus.

The operator manually adjusts the phase adjust dial 41 (FIGS. 1, 7b) to accomplish the phase adjustment of the sinusoidal signal in line 27. The phase adjustment dial 41 allows up to 180 degrees of phase adjustment. If more adjustment is required to properly adjust the locations of the major and minor diameters on the work piece, a phase reversal switch 100 (FIG. 7b) is provided which switches the phase by 180 degrees, thereby allowing another 180 degrees of phase adjustment by dial 41. In total, a full 360 degrees of phase adjustment is achievable. In practice, ganged transfer functions of the form:

$$G(s)=C[(b-s)/(b+s)]$$

where:
G(s) is the complex transfer function,
C is a constant,
s is the complex Laplace frequency variable, and
b is the adjustable parameter.

are used to adjust the phase where turning dial 41 adjusts the parameter b.

FIG. 7b illustrates a more detailed block diagram of the apparatus 20 and control system 52. The control system 52 comprises a controller 33 (including a conditioner 73 and a phase synchronized wave form generator 31), a phase adjusting, section 29, and magnitude adjusting section 66. The phase adjusting section 29 includes a phase adjusting circuit 99, a phase reverse circuit 100 and the phase dial 41. The magnitude adjusting section 66 includes a gain adjust circuit 101 and the gain dial 39. The conditioner includes comparators 72a, 72b which check the incoming pulse signals from sensors 50a, 50b against a preset voltage threshold and output a voltage signal of constant voltage when the threshold is exceeded. The voltage signal output lasts for a short duration, for example, for the duration of the input sensor pulse. The voltage values of a short duration from each sensor 50a, 50b are received at poles R and S of a flip flop device 81 which outputs a square wave input signal of constant duty cycle at pole Q in line 25. Pulse from comparator 72a flips the flip flop 81 to a first voltage value and it is maintained at that value until a pulse is received from comparator 72b, after which the voltage is set to a lower (preferably zero) value. The output of the flip flop 81 is a constant duty cycle square wave signal that represents the two per rev signal of FIG. 4 which is synchronized with the rotation of the shaft 28 (FIG. 1).

The square wave of constant duty cycle on line 25 is input to the phase synchronized waveform generator 31 which ensures that the sinusoidal phase synchronized input signal in line 27 exiting, the generator 31 is always synchronized with the input wave form on line 25 regardless of small changes in frequency of the equipment 22. This function must be performed in any analog, control system because any phase shift present due to changes in machine speed will effect the ultimate positioning of the major and minor diameters on the work piece 34. Therefore, it is imperative to include analog circuitry, such as the phase synchronized waveform generator 31, to provide an input signal in line 27 which is phase shift insensitive to changes in input frequency.

The phase synchronized waveform generator 31 includes first 77 and second 79 switch capacitor filters which are center adjustable (moveable) band pass filters which include center frequencies that are offset from one another, preferably one above and one below the operational frequency (see FIG. 7c). The identical square wave signal from flip flop 81 is provided directly to each filter 77, 79. The filtered output of the filters 77, 79 are sinusoidal signals which are added tog,ether at summing junction 87a to produce a reconstructed sinusoidal input signal in line 27 which is phase locked to the square wave input 25. A tracking circuit 90 within controller 33 adjusts the clock frequency provided to the center adjustable switch capacitor filters 77, 79 thereby maintaining a discriminator error signal 104 at zero.

The tracking circuit 90 includes Full Wave (F. W.) Rectifiers which convert the output signals from filters 77, 79 to DC signals with amplitudes equal to the AC amplitudes. The outputs of rectifiers 18a, 18b are provided to the subtracting junction 87b where they are subtracted to produce a discriminator error signal 104. The discriminator error signal 104 exiting from the junction 87b is multiplied by a variable gain K in block 103 and then integrated in integrating block 91. This integrated error signal is provided to summing junction 87d where a manual frequency adjustment from manual adjustment block 98 is added. The output of the summing junction 87d in line 69 is a DC setting voltage which sets the clock frequency of the Voltage Controlled Oscillator (VCO) 102. The clock frequency correspondingly sets the center frequency of each adjustable center frequency filter 77, 79. If the discriminator error signal 104 is zero, then the setting voltage in line 69 will correspond to the manually set frequency from block 98. A feedback path utilizes the manually set frequency f added at junction 87c to the square of the frequency $f^2$ from block 17 to set the gain K in gain block 103. This feedback loop attempts to hold the discriminator error signal 104 at zero.

Thus, if the error signal 104 is negative, corresponding to a drop in frequency, then the clock frequency is decreased to repositionally decrease the centers of the filters 77, 79 thereby ensuring that the input signal 27 is phase locked to the input square wave form 25. The system 20 may optionally include an output off block 110 which disables the system 20 based upon an input from, for example, a user on-off switch (not shown), a remote disable signal 111 or a signal 112 from the press-to-tune switch 97 (to be described later) such that no drive signal goes to the actuator 48.

Figure 7C:
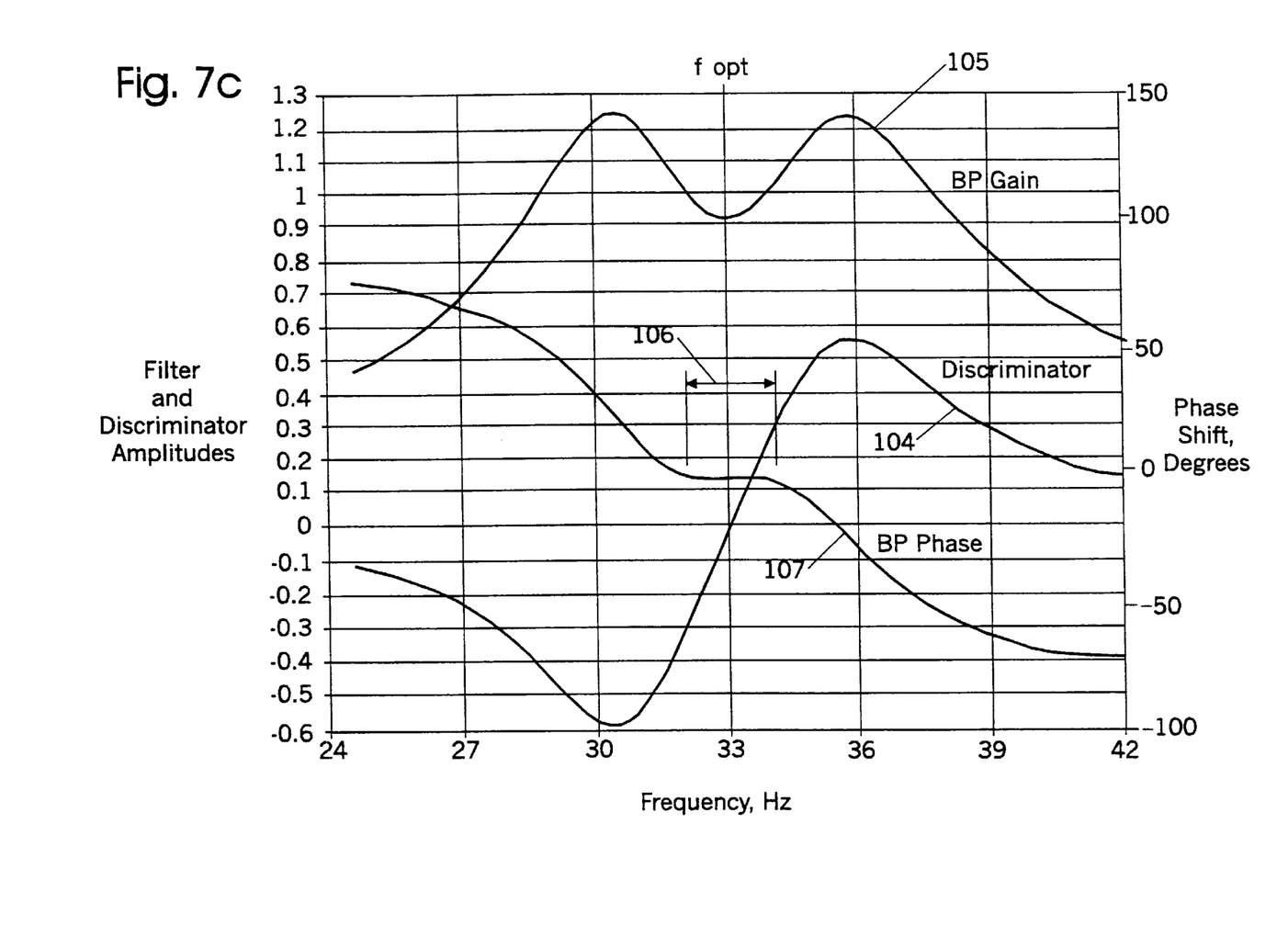
FIG. 7c illustrates performance parameters of the center adjustable filters.

As best shown in FIG. 7c, it is desired to center the band pass filters (as indicated by the double humped BP Gain 105) at the operational frequency f opt, in this case 33 hz. If the frequency f opt were to increase slightly due to warm up of the components, then the discriminator error magnitude 104 would be positive. This would result in an increase in the clock frequency of VCO 102 thereby setting, the position of the center frequency of the filters 77, 79 to a higher value. As can be seen in FIG. 7c, there is a narrow frequency range 106 in the BP phase plot 107 where slight changes in frequency result in zero phase change between the incoming and outgoing wave forms in lines 25 and 27. By moving the center frequencies of the band pass filters 77, 79, this region 106 may always be maintained at the operating frequency f opt.

To initially calibrate the system 20, the equipment is turned on. Then the press to tune switch 97 is pressed by the operator, This disables the feedback loop, thus the VCO 102 is set to the manual adjust frequency as dictated by the manual adjust setting 98. The manual adjustment frequency fm is set based upon the max meter 108 and the zero meter 109. First the manual adjustment 98 is adjusted until the max meter 108 reads maximum value. Then the zero meter 109 is set to zero. This procedure sets the center frequencies of the filters 77, 79 above and below the operation frequency f opt by maximizing signal 27 and minimizing the discriminator error 104. One the system 20 is initially set, any changes in frequency by the equipment 22 are easily accommodated and no phase lead or lag is present in the signal 27 which would change the positions of the major and minor diameters machined on the work piece 34.

Figure 8:
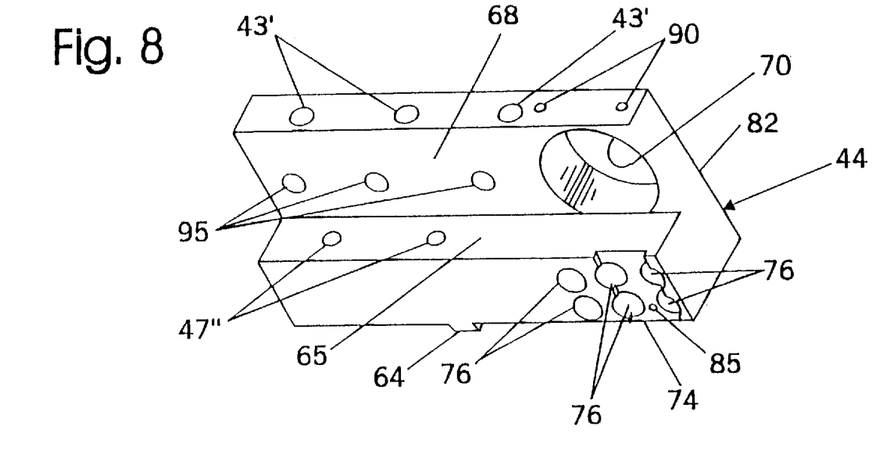
FIG. 8 illustrates a perspective view of the tool block in accordance with the present invention.

FIG. 8 illustrates a perspective view of the toot block 44. The tool block 44 is manufactured from 304 or other austenitic stainless steel and preferably includes an L-shaped cross section as viewed from the end thereof. The block 44 includes a planar platform 65 and an upright portion 68 extending perpendicularly therefrom. A transversely extending through hole 70 formed in the upright portion 68 receives a portion of the actuator 48 (FIGS. 1, 6, 13) therein. The tool block 44 is secured to the x-y table 38 of the lathe, turning center, or like equipment 22 by inserting the key 64 in T-slot 72 (FIG. 1) and inserting bolts 43 (FIG. 1) through holes 43' and into T-nuts (not shown) which are slideably carried in the T-slot 72 of the x-y table 38 (FIG. 1).

Referring, to FIGS. 1, 8, and 10, the tool holder 46 is secured to tool block 44 by way of bolts 47 (FIG. 1) inserted through holes 47a in holder 46 and into threaded holes 47" formed in tool block 44. Slot 74 and threaded hole 85 are used for securing a later described vertical stiffener 78 (FIG. 12) to the tool block 44. Holes 76 receive socket head cap screws which thread into holes 76' on the end of L-bracket 58 (FIG. 9). Transverse holes 95 receive transverse bolts 47' (FIG. 1a) which thread into like threaded holes 96 in the back of tool holder 46 (FIG. 10) to secure the tool holder to the tool block 44 in the transverse direction.

Figure 11:
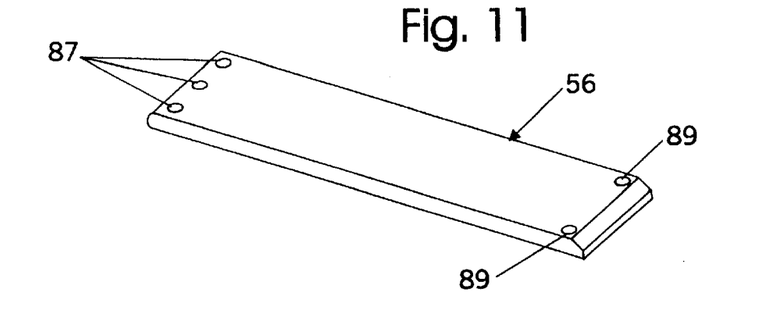
FIG. 11 illustrates a perspective view of a plate portion of the bracket assembly.

FIG. 9 illustrates a lower L-bracket 58 which is also manufactured from 304 stainless steel. The bracket 58 attaches to the back side 82 of the tool block 44 by way of bolts (not shown. The bolts (not shown) are received through the holes 76 in block 44 aligned with the six threaded holes 76' in bracket 58. Holes 80 are used to attach bracket plate 56 (FIG. 11). Hole 35 in bracket 58 receives bolt 83 which threads into the threaded bore 21 at the end of actuator 48 (FIG. 6).

FIG. 10 illustrates a perspective view of the flexible tool holder 46 which includes first end 67, second end 45 and a central longitudinal axis A—A. The holder 46 is preferably mounted to the tool block 44 via vertical holes 47' near first end 67. The holder 46 is preferably manufactured from a 17-4 PH steel material and includes a relieved portion 71 such that some portion of the tool holder acts like a cantilever beam spring. The holder 46 preferably includes a defined spring member 63 preferably formed by a dog bone-shaped vertically-extending, cutout 49. The dog, bone shape provides that when the spring, member 63 flexes due to actuator loads applied at threaded hole 61 of second end 45, that rotation at the tool location is minimized. A tool insert 75 (FIG. 1), such as an ANSI/ISO cartridge available from Kennametal of Latrobe, Pa., is secured at threaded hole 84 and holds the tool 40 (FIG. 1). In other words, loads applied by the actuator 48 translate the tool 40 in a substantially transverse direction.

FIG. 11 illustrates the upper bracket plate 56 which attaches to the L-bracket 58 by bolts (not shown) inserted through holes 87 and into threaded holes 80 (FIG. 9). The other end of plate 56 attaches to the top of tool block 44 via bolts (not shown) inserted through holes 89 and into threaded holes 90 (FIG. 8). This plate 56 is preferably manufactured from 302 or other austenitic stainless steel.

Figure 12:
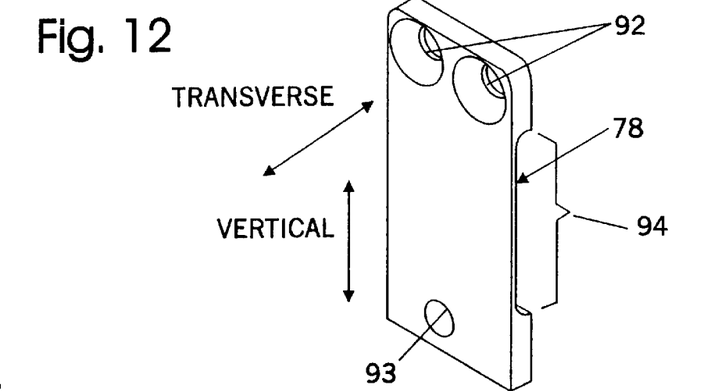
FIG. 12 illustrates a perspective view of a vertical stiffener.

FIGS. 12 and 13 illustrates the vertical stiffener 78 which attaches between the tool holder 46 (FIG. 10) and the tool block 44 (FIG. 8). The stiffener 78 is preferably manufactured from 17-4 PH steel and includes a first set of counter bored holes 92 which get aligned with threaded holes 86 formed in slot 88 in tool holder 46 (FIG. 10) and another hole 93 in its lower end which gets aligned with the threaded hole 85 in tool block 44 (FIG. 8). Screws (not shown) attach the stiffener 78 to the holder 46 and block 44. The stiffener 78 includes a thinner plate spring, section 94 which provides a very high vertical stiffness and a very low transverse bending stiffness. Attaching the vertical stiffener 78 between the tool holder 46 and block 44 minimizes chatter whilst not appreciably effecting the transverse stiffness that the actuator 48 (FIG. 6) has to push against.

FIG. 13 illustrates a perspective assembly view of the vibrating tool assembly 42. The bolts, screws, tool and tool insert have intentionally been left off for clarity. The assembly 42 includes the tool block 44, the tool holder 46 mounted to the tool block 44 at the first end 67 thereof, a vertical stiffener 78 attached between the block 44 and holder 46, a bracket assembly 51 secured to the tool block 44 (including an L-bracket 58 and top plate 56) and the actuator 48 interconnected between the tool block 44 and the second end 45 of tool holder 46 by way of bracket assembly 51.

In operation, the control system 52 (FIG. 1) produces a 2 per rev phase and magnitude adjusted output signal 23 thereby driving the actuator 48 which, in turn, acts to produce forces between the block 44 (through bracket assembly 51) the second end 45 of the tool holder 46 which and dynamically vibrates the machine tool 40 secured by tool cartridge 75. This produces precisely located major and minor diameters on the work piece 34.

In summary, it should be apparent from the foregoing that the present invention comprises a novel apparatus, method and controller for machining non-circular profiles on a work piece. The foregoing is illustrative of the present invention and is not to be construed as limiting thereof. Although an exemplary embodiment of this invention has been described, those skilled in the art will readily appreciate that many modifications are possible to the exemplary embodiment without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An apparatus for machining of a non-circular profile on a work piece, the work piece being positioned in the apparatus and having an axis of rotation, said apparatus comprising:
   (a) a first position sensor and a second position sensor for deriving position signals correlated with a rotational position of the work piece in the apparatus;
   (b) a vibrating tool assembly further comprising;
      (i) a rigid tool block,
      (ii) a tool holder including first and second ends defining a longitudinal axis, said tool holder mounted to said block at said first end and adapted to receive a machine tool at said second end, said tool holder including an integral spring member for providing relative ease of movement at said second end of said tool holder in a transverse direction, said longitudinal axis of said tool holder being disposed substantially parallel to said axis of rotation, and
      (iii) an actuator arranged to impart vibrational motions to said tool holder along said transverse direction,
   (c) a control system for receiving said position signals and generating an output signal to said actuator, said control system including;
      (i) means for adjusting a magnitude and phase of said position signals and producing a magnitude and phase adjusted output signal, and
      (ii) an amplifier for amplifying said magnitude and phase adjusted signal; and
   wherein said means for adjusting adjusts the magnitude and phase of said position signals to produce a magnitude and phase adjusted output signal that provides a non-circular profile on the work piece, the non-circular profile having minimum and maximum dimensions in desired positions relative to the rotational position of the work piece and a desired amount of ovality.

2. The apparatus of claim 1 wherein said means for adjusting comprises means for a user to manually adjust said magnitude and phase.

3. The apparatus of claim 1 further comprising means for generating, a two per revolution square wave based upon said position signals.

4. The apparatus of claim 1 further comprising means for generating a two per revolution sinusoidal input which is phase locked to said position signals.

5. The apparatus of claim 4 further wherein said means for generating said sinusoidal input further comprises a plurality of band pass filters.

6. The apparatus of claim 5 further wherein said plurality of band pass filters are adjustable.

7. The apparatus of claim 6 further including feedback means for adjusting said plurality of band pass filters.

8. The apparatus of claim 7 further wherein said feedback means adjusts a clock frequency provided to a plurality of switched capacitor filters.

9. The apparatus of claim 1 wherein said control system further comprises a plurality of switched capacitor band pass filters.

10. The apparatus of claim 1 wherein said control system further comprises:
   i) a signal conditioner for generating a square wave form from said position signals, and
   ii) means for producing a two per revolution sinusoidal input signal from said square wave form which is phase locked to said square wave form.

11. The apparatus of claim 1 wherein said spring member includes a tranverse stiffness in the range between about 5,000 lbf./in and 9,000 lbf./in.

12. The apparatus of claim 1 wherein said tool holder includes a dog bone-shaped cutout portion which minimizes rotation of said machine tool.

13. The apparatus of claim 1 wherein said actuator is transversely disposed between said second end of said tool holder and an end of a bracket assembly secured to a back side of said tool block.

14. The apparatus of claim 13 wherein said actuator includes a transverse stiffness of at least about 100,000 lb./in.

15. The apparatus of claim 1 wherein said first and second position sensors are located on an end of a shaft.

16. The apparatus of claim 1 wherein said first sensor and said second sensor are mounted adjacent to an end of a shaft rigidly interconnected to said work piece.

17. The apparatus of claim 1 wherein said actuator is solid state.

18. The apparatus of claim 17 wherein said solid state actuator is one selected from a group consisting of a piezoelectric or magnetostrictive actuator.

19. The apparatus of claim 1 further including a vertical stiffener spring mounted between said second end of said tool holder and said tool block.

20. The apparatus of claim 1 wherein said vibrating tool assembly includes said tool block having an upright portion and a platform formed thereon, said tool holder being bolted to said platform at one end thereof, said actuator being mounted to a bracket assembly secured to a backside of said tool block on one end and threadedly connected to said tool holder on another, said actuator being received through a hole formed in said upright portion.

21. The apparatus of claim 20 further comprising a vertical stiffener spring including a relatively low transverse stiffness mounted between said tool block and said second end of said tool holder.

22. The apparatus of claim 1 wherein control system further comprises a wave form generator for generating a 2 per rev sinusoidal wave form wherein said wave form generator includes means for maintaining a constant phase relationship between a square wave form derived from said at least one position signal and said 2 per rev sinusoidal wave form when an operating frequency changes.

23. An apparatus for machining of a non-circular profile on a work piece, the work piece having an axis of rotation, said apparatus comprising:
   (a) a plurality of position sensors for deriving a plurality of position signals correlated with a rotational position of said work piece,
   (b) a vibrating tool assembly further comprising;
      (i) a rigid tool block,
      (ii) a tool holder including, first and second ends defining a longitudinal axis, said longitudinal axis being substantially aligned with said axis of rotation, said tool holder mounted to said block at said first end and adapted to receive a machine tool at said second end, said tool holder including an integral spring member for providing relative ease of movement at said second end of said tool holder in a transverse direction generally orthogonal to said longitudinal axis,
      (iii) means for restraining relative movement between said tool holder and said tool block in a direction perpendicular to both said transverse direction and said longitudinal axis, and
      (iv) a solid state actuator arranged to impart vibrational motion to said tool holder at said second end,
   (c) a control system including;
      i) a signal conditioner for generating a square wave from said plurality of position signals,
      ii) means for producing a 2 per rev sinusoidal signal which is phase locked to said square wave signal,
      iii) means for adjusting a magnitude and phase of said 2 per rev sinusoidal signal and producing a magnitude and phase adjusted output signal, and
      iv) an amplifier for amplifying said adjusted output signal,
   whereby a non-circular profile is machined on the work piece with minimum and maximum dimensions precisely located in desired positions and where a desired amount of ovality is achieved.

24. A method for machining a non-circular profile on a work piece comprising the steps of:
   (a) positioning the work piece within a rotating chuck of a machine in a predetermined orientation, said work piece including an axis of rotation;
   (b) providing a plurality of sensors for deriving a plurality of signal representative of a rotational position of the work piece;
   (c) providing a tool block moveably mounted to the machine;
   (d) mounting a tool holder to said tool block such that a longitudinal axis of said holder is substantially parallel with said axis of rotation, said tool holder including a spring member allowing ease of movement of an end portion of said tool holder in a transverse direction;
   (e) connecting an actuator to said portion of said tool holder;
   (f) providing a control system;
   (g) processing said plurality of input signals within said control system to produce a magnitude and phase adjusted output signal selected to provide a non-circular profile on the work piece, the magnitude being selected to provide the non-circular profile a desired amount of ovality and the phase being selected to provide the non-circular profile a maximum and minimum dimension in desired positions relative to the rotational position of the work piece; and
   (h) providing said adjusted output signal to said actuator to produce forces between the tool block and tool holder to machine the non-circular profile on the work piece responsive to said output signal.

25. The method of claim 24 wherein said control system further comprises means for manually adjusting of a magnitude and phase of said a plurality of input signals.

26. An apparatus, comprising:
   (a) a sensor producing a signal correlated with a member's motion,
   (b) a vibrating assembly including;
      (i) a base,
      (ii) a object mounted relative to said base, and
      (iii) an actuator interconnected between said base and said object,
   (c) a control system including:
      (i) means for generating a square wave based upon said signal,
      (ii) a waveform generator for producing a sinusoidal input which is phase locked to said square wave, said generator further comprising a plurality of center adjustable band pass filters, said generator further including feedback means for adjusting a band of each said filter,
      iii) means for adjusting a magnitude and phase of said sinusoidal input and producing a magnitude and phase adjusted output signal, and
      iv) an amplifier for amplifying said magnitude and phase adjusted output signal and producing an amplified output signal
   whereby said amplified output signal is provided to said actuator to vibrate said object.

27. An apparatus for machining of a non-circular profile on a work piece, the work piece having an axis of rotation, said apparatus comprising:
   (a) a position sensor that derives a position signal correlated with a rotational position of the work piece;
   (b) a vibrating tool assembly, the vibrating tool assembly comprising;
      (i) a rigid tool block,
      (ii) a tool holder including first and second ends defining a longitudinal axis, said tool holder mounted to said block at said first end and adapted to receive a machine tool at said second end, said tool holder including an integral spring member that allows movement of said second end of said tool holder in a transverse direction, said longitudinal axis of said tool holder being disposed substantially parallel to said axis of rotation, and
      (iii) an actuator positioned to impart vibrational motions to said second end of said tool holder along said transverse direction; and
   (c) a control system responsive to the position signal that generates an output signal connected to said actuator, said control system including,
      i) a signal conditioner circuit that generates a square wave responsive to the position signal,
      ii) a sinusoidal signal generation circuit responsive to the square wave that produces a two per revolution sinusoidal input signal, the two per revolution sinusoidal input signal being phase locked to said square wave, iii) a magnitude and phase adjusting circuit responsive to the two per revolution sinusoidal input signal that produces a magnitude and phase adjusted output signal, and iv) an amplifier circuit that amplifies said magnitude and phase adjusted output signal.

28. An apparatus for machining of a non-circular profile on a work piece, the work piece having an axis of rotation, said apparatus comprising:

(a) a position sensor that derives a position signal correlated with a rotational position of the work piece;

(b) a vibrating tool assembly, the vibrating tool assembly comprising;

(i) a rigid tool block, (ii) a tool holder including first and second ends defining a longitudinal axis, said tool holder mounted to said block at said first end and adapted to receive a machine tool at said second end, said tool holder including an integral spring member that allows movement of said second end of said tool holder in a transverse direction, said longitudinal axis of said tool holder being disposed substantially parallel to said axis of rotation, said integral spring member having a transverse stiffness in the range of between about 5,000 lbf./in and about 9,000 lbf./in, and (iii) an actuator positioned to impart vibrational motions to said second end of said tool holder along said transverse direction; and (c) a control system responsive to the position signal that generates an output signal connected to said actuator, said control system including, i) a magnitude and phase adjusting circuit responsive to the position signal that produces a magnitude and phase adjusted output signal, and ii) an amplifier circuit that amplifies said magnitude and phase adjusted output signal.

29. An apparatus for machining of a non-circular profile on a work piece, the work piece having an axis of rotation, said apparatus comprising:

(a) a plurality of position sensors that derive position signals correlated with a rotational position of the work piece;

(b) a vibrating tool assembly, the vibrating tool assembly comprising;

(i) a rigid tool block, (ii) a tool holder including first and second ends defining a longitudinal axis, said tool holder mounted to said block at said first end and adapted to receive a machine tool at said second end, said tool holder including an integral spring member that allows movement of said second end of said tool holder in a transverse direction, said longitudinal axis of said tool holder being disposed substantially parallel to said axis of rotation, and (iii) an actuator positioned to impart vibrational motions to said second end of said tool holder along said transverse direction; and (c) a control system responsive to the position signals that generates an output signal connected to said actuator, said control system including, i) a magnitude and phase adjusting circuit responsive to the position signals that produces a magnitude and phase adjusted output signal, and ii) an amplifier circuit that amplifies said magnitude and phase adjusted output signal.

30. An apparatus for machining of a non-circular profile on a work piece, the work piece having an axis of rotation, said apparatus comprising:

(a) a position sensor that derives a position signal correlated with a rotational position of the work piece;

(b) a vibrating tool assembly, the vibrating tool assembly comprising;

(i) a rigid tool block, (ii) a tool holder including first and second ends defining a longitudinal axis, said tool holder mounted to said block at said first end and adapted to receive a machine tool at said second end, said tool holder including an integral spring member that allows movement of said second end of said tool holder in a transverse direction, said longitudinal axis of said tool holder being disposed substantially parallel to said axis of rotation, and (iii) an actuator positioned to impart vibrational motions to said second end of said tool holder along said transverse direction;

(c) a vertical stiffener spring mounted between said second end of said tool holder and said tool block; and (d) a control system responsive to the position signal that generates an output signal connected to said actuator, said control system including, i) a magnitude and phase adjusting circuit responsive to the position signal that produces a magnitude and phase adjusted output signal, and ii) an amplifier circuit that amplifies said magnitude and phase adjusted output signal.

* * * * *